(12) United States Patent
Bischof et al.

(10) Patent No.: US 11,703,079 B2
(45) Date of Patent: Jul. 18, 2023

(54) BEARING ELEMENT WITH A SMOOTH CONTINUOUS PROFILE

(71) Applicant: BORGWARNER INC., Auburn Hills, MI (US)

(72) Inventors: Kenneth Bischof, Arden, NC (US); Zachary Ashton, Arden, NC (US)

(73) Assignee: BorgWarner Inc., Auburn Hills, MI (US)

( * ) Notice: Subject to any disclaimer, the term of this patent is extended or adjusted under 35 U.S.C. 154(b) by 149 days.

(21) Appl. No.: 17/255,171

(22) PCT Filed: Jun. 28, 2018

(86) PCT No.: PCT/US2018/040074
§ 371 (c)(1),
(2) Date: Dec. 22, 2020

(87) PCT Pub. No.: WO2020/005262
PCT Pub. Date: Jan. 2, 2020

(65) Prior Publication Data
US 2021/0262522 A1    Aug. 26, 2021

(51) Int. Cl.
*F16C 17/02*    (2006.01)
*F16C 17/18*    (2006.01)
*F01D 25/16*    (2006.01)
*F16C 17/26*    (2006.01)

(52) U.S. Cl.
CPC .......... *F16C 17/028* (2013.01); *F01D 25/166* (2013.01); *F16C 17/18* (2013.01); *F16C 17/26* (2013.01); *F16C 2360/24* (2013.01)

(58) Field of Classification Search
CPC ........ F16C 17/028; F16C 17/18; F16C 17/26; F16C 2360/24; F01D 25/166
See application file for complete search history.

(56) References Cited

U.S. PATENT DOCUMENTS

| 5,863,134 | A | 1/1999 | Chen | |
|---|---|---|---|---|
| 6,243,230 | B1 * | 6/2001 | Nii | F16C 17/18 360/99.08 |
| 6,402,385 | B1 * | 6/2002 | Hayakawa | F16C 17/028 384/114 |
| 9,726,189 | B2 * | 8/2017 | Nishida | F01D 25/166 |
| 9,777,766 | B1 | 10/2017 | Bischof et al. | |

(Continued)

FOREIGN PATENT DOCUMENTS

| DE | 102011015932 A1 | 10/2012 |
|---|---|---|
| EP | 1998008 A1 | 12/2008 |
| EP | 3258123 A1 | 12/2017 |

*Primary Examiner* — Alan B Waits
(74) *Attorney, Agent, or Firm* — von Briesen & Roper, s.c.

(57) ABSTRACT

A bearing element includes an inner surface (54) configured to receive a cylindrical shaft (18). The inner surface (54) includes a smooth profile having a plurality of sections (502). Each section (502) having a taper portion (506) between a first arc-span point (512) and a second arc-span point (514), a constant-radius portion (508) between the second arc-span point (514) and a third arc-span point (516), and a transition portion (510) between the third arc-span point (516) and a fourth arc-span point (518). An inner-surface radius dimension (520) changes from an inner-diameter major dimension to an inner-diameter minor dimension at the taper portion (506) and back at the transition portion.

18 Claims, 5 Drawing Sheets

(56) References Cited

U.S. PATENT DOCUMENTS

| | | | |
|---|---|---|---|
| 11,066,983 B2* | 7/2021 | Futae | F16N 7/36 |
| 2006/0078239 A1 | 4/2006 | Dimofte | |
| 2015/0330442 A1* | 11/2015 | Futae | F04D 17/10 |
| | | | 415/111 |
| 2018/0128163 A1* | 5/2018 | Ueda | F16C 17/10 |
| 2018/0258984 A1* | 9/2018 | Futae | F16C 33/1075 |

* cited by examiner

BEARING ELEMENT WITH A SMOOTH CONTINUOUS PROFILE

TECHNICAL FIELD

The present disclosure generally relates to bearing systems for rotating elements and, in particular, relates to bearing systems for use in turbochargers.

BACKGROUND

Bearing systems typically support rotating elements in a low-friction manner. In an exemplary turbocharger, a bearing system is used to support a rotating shaft that is coupled to a compressor wheel on one end and a turbine wheel on the other end. The common shaft may rotate at speeds that approach hundreds of thousands of revolutions per minute. Further, the turbocharger may operate in a high temperature environment.

Some conventional bearing elements are machined by cutting several arcs of constant radius into an inner surface of the bearing element. At the intersection of the constant-radius arcs, discontinuities in the inner surface occur which may cause interruptions in fluid flow. Further, manufacture of these conventional bearings is a time-intensive process. Conventional tri-lobe bearing elements are designed for bi-directional shaft rotation, and are not optimized for mono-directional shaft rotation, which may allow for increased shaft rotation speeds.

US Patent Application Publication No. 2006/0078239 (hereinafter the '239 publication) discloses a wave bearing concept for journal and thrust fluid film bearings. Such a bearing is used in pressurized gas journal wave bearings for increased load capacity and dynamic stability, journal wave bearings with liquid lubricants, and the like. Further, the rotation of the shaft within the bearing is either mono-directional or bi-directional.

SUMMARY

In accordance with one aspect of the present disclosure, a bearing element is disclosed. The bearing element includes an inner surface configured to receive a cylindrical shaft, the inner surface having a smooth profile and comprising a plurality of sections, each section having a taper portion between a first arc-span point and a second arc-span point, a constant-radius portion between the second arc-span point and a third arc-span point, and a transition portion between the third arc-span point and a fourth arc-span point. The inner-surface radius dimension changes from an inner-diameter major dimension at the first arc-span point to an inner-diameter minor dimension at the second arc-span point and changes from the inner-diameter minor dimension at the third arc-span point to the inner-diameter major dimension at the fourth arc-span point.

A first angular distance between the first arc-span point and the second arc-span point is larger than a second angular distance between the third arc-span point and the fourth arc-span point. Further, the inner surface includes a continuous surface at the first, second, third, and fourth arc-span points. The fourth arc-span point of a first section adjoins a first arc-span point of a subsequent section.

In yet another embodiment, a turbocharger bearing system includes a first bearing element and a second bearing element. The first bearing element includes an inner surface configured to receive a cylindrical shaft, the inner surface includes a smooth profile and comprising a plurality of sections, each section having a taper portion between a first arc-span point and a second arc-span point, a constant-radius portion between the second arc-span point and a third arc-span point, and a transition portion between the third arc-span point and a fourth arc-span point.

An inner-surface radius dimension changes from an inner-diameter major dimension at the first arc-span point to an inner-diameter minor dimension at the second arc-span point and changes from the inner-diameter minor dimension at the third arc-span point to the inner-diameter major dimension at the fourth arc-span point.

A first angular distance between the first arc-span point and the second arc-span point is larger than a second angular distance between the third arc-span point and the fourth arc-span point. The inner surface includes a continuous surface at the first, second, third, and fourth arc-span points, and the fourth arc-span point of a first section adjoins the first arc-span point of a subsequent section.

These and other aspects and features of the present disclosure will be more readily understood when read in conjunction with the accompanying drawings.

DETAILED DESCRIPTION

The following description of the variations is merely illustrative in nature and is in no way intended to limit the scope of the invention its application, or uses.

Figure 1:
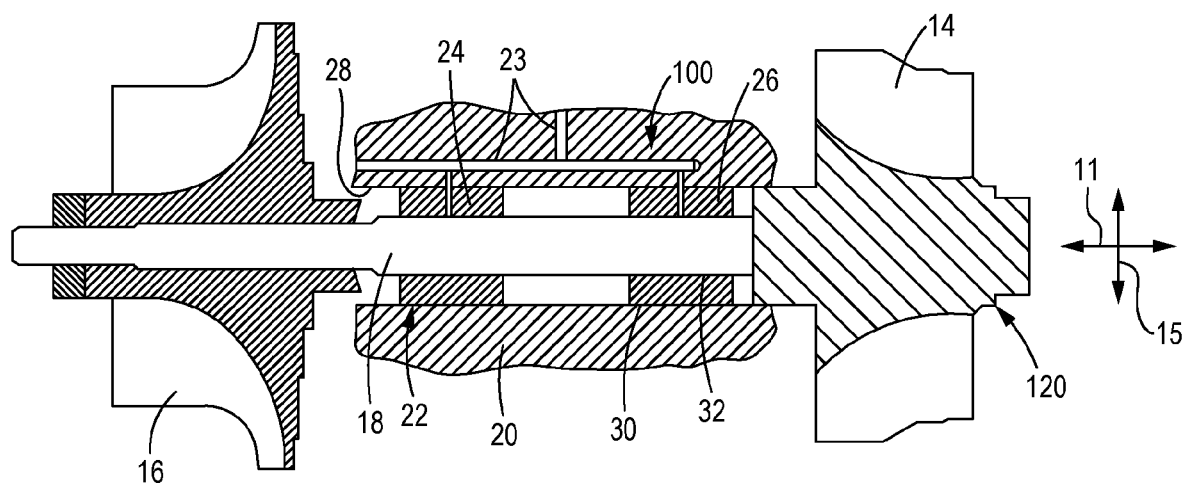
FIG. 1 is a cross-sectional view of a first rotating machine, in accordance with an embodiment of the present disclosure.

FIG. 1 depicts a schematic overview of a first rotating machine, in accordance with an embodiment of the present disclosure. In a number of variations as illustrated in FIG. 1, a bearing system 100 may be used within a rotating machine 120, such as, but not limited to, a turbocharger. The rotating machine 120 includes a compressor wheel 16 that may be connected to the turbine wheel 14 via the common shaft 18. The shaft 18, which may be a cylindrical shaft, extends through a housing 20. The bearing system 100 is contained within the housing 20, and the shaft 18 extends through the bearing system and rotates about the axial direction 11 (e.g., a longitudinal axis). The radial direction 15 may intersect the axial direction 11, which extends perpendicular from the axial direction 11 in any of the 360 angular degrees about the axial direction 11.

The bearing system 100 may include a plurality of bearing elements. A compressor-side bearing element 24 is depicted on the left in FIG. 1 and a turbine-side bearing element 26 is depicted on the right in FIG. 1. The bearing elements 24, 26 may be contained in a bore 28 of the housing 20 and supplied with a lubricant through a lube oil system 23. Either one or both of the bearing element 24, 26 may be semi-floating bearings, full-floating bearings, or the like. A semi-floating bearing element may be precessed into a cartridge within the housing 20. The semi-floating precessed bearing element is permitted to slightly rotate, or wobble, about the shaft. A floating bearing element may spin relative to the housing and at a speed less than the rotational speed of the shaft 18. In such an embodiment, there may be two hydrodynamic oil film interfaces that includes an outer film interface 30 between the housing 20 and the bearing elements 24, 26, and an inner film interface 32 between the bearing elements 24, 26 and the shaft 18.

Figure 2:
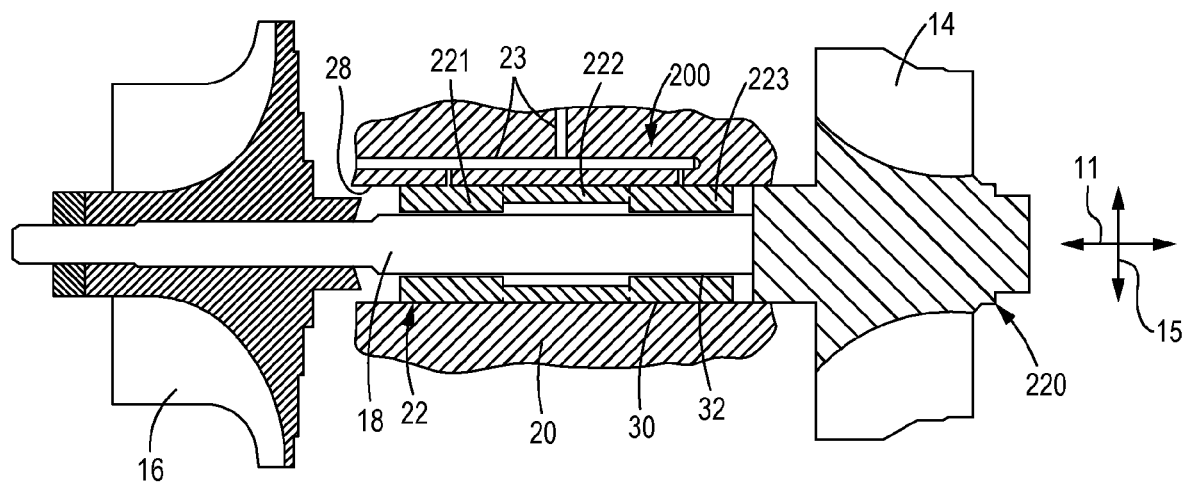
FIG. 2 is a cross-sectional view of a second rotating machine, in accordance with an embodiment of the present disclosure.

FIG. 2 is a cross-sectional view of a second rotating machine, in accordance with an embodiment of the present disclosure. In particular, FIG. 2 depicts the rotating machine 220 that is similar to the rotating machine 120, except with the integrated bearing system 200. The integrated bearing system 200 includes a first bearing element portion 221, a spacer portion 222, and a second bearing element portion 223. The first bearing element portion 221 is similar to the bearing element 24 of FIG. 1, and the second bearing element portion 223 is similar to the bearing element 26 of FIG. 1, in that both portions 221, 223 are configured to support the shaft 18 and may be machined to have the inner surface 54, which is disclosed in more detail throughout the specification. The spacer portion may have a larger diameter than the first and second bearing element portions 221, 223 to provide a greater clearance about the shaft 18. In some embodiments, the integrated bearing system 200 is realized by a semi-floating cartridge, with each of the portions 221, 222, 223 being integrated into one unitized piece. In other embodiments, the spacer portion 222 joins the first and second bearing element portions 221, 223 as three separate pieces affixed together.

Figure 3:
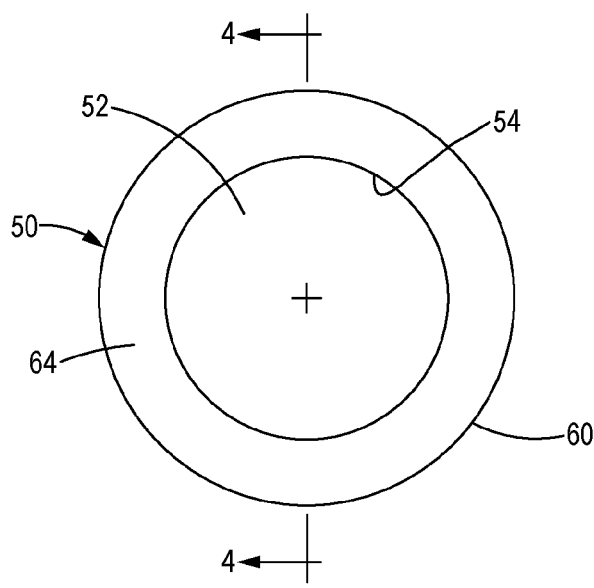
FIG. 3 is an end view of a bearing element, in accordance with an embodiment of the present disclosure.
Figure 4:
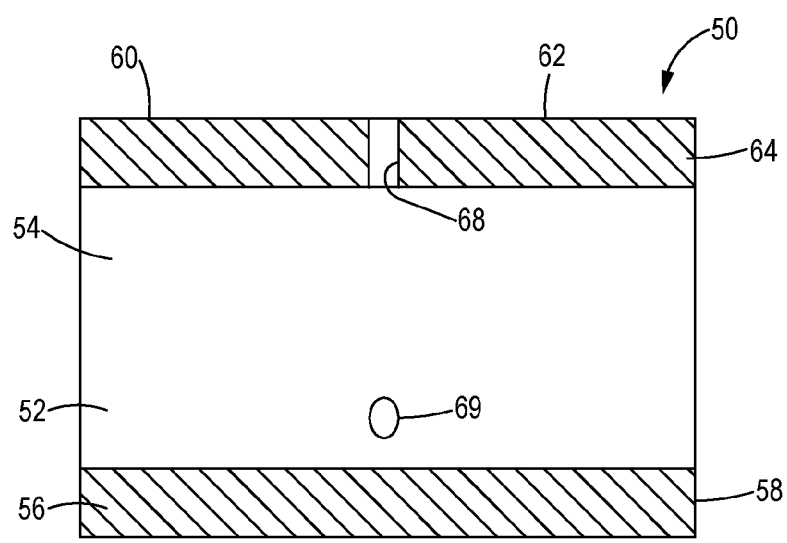
FIG. 4 depicts a cross-sectional illustration of part of a bearing element of FIG. 2 taken along line 3-3, constructed in accordance with an embodiment the present disclosure.

FIG. 3 depicts a schematic illustration of a bearing element, in accordance with an embodiment of the present disclosure. FIG. 4 depicts a schematic cross sectional illustration of part of a bearing element, taken along the line 4-4 indicated in FIG. 3 in accordance with an embodiment of the present disclosure. In particular, FIGS. 3 and 4 depict the bearing element 50, which may be used in the bearing system 100 of FIG. 1 as either bearing element 24 or 26, or the bearing system 200 of FIG. 2 as either of the first or second bearing element portions 221, 223. The bearing element 50 may be constructed (e.g., machined) of a rigid material and have a generally hollow cylindrical shape. The bearing element 50 includes an axially extending opening 52 that is able to receive the shaft 18. The opening 52 defines an inner surface 54. The inner surface 54 extends around a 360 degree circumference of the opening 52 from a first end 56 to a second end 58 of the bearing element 50. The inner surface 54 may have a smooth profile of varying thickness, as discussed more fully herein.

The bearing element 50 may have an outermost perimeter 60 that extends around the bearing element 50 and defines and outer circumferential surface 62 that extends from the first end 56 to the second end 58. The bearing element 50 may have a wall 64 that may exist between the inner surface 54 and the outer circumferential surface 62. A number of openings 68, 69 may extend in the radial direction 15 through the wall 64 from the outer circumferential surface 62 to the inner surface 54. The openings 68, 69 may cooperate with the lube oil system 23 to supply lubricant to the inner surface 54 and the interfacing shaft 18. Positioning of the openings 68, 69 is discussed in more detail in conjunction with FIG. 5.

Figure 5:
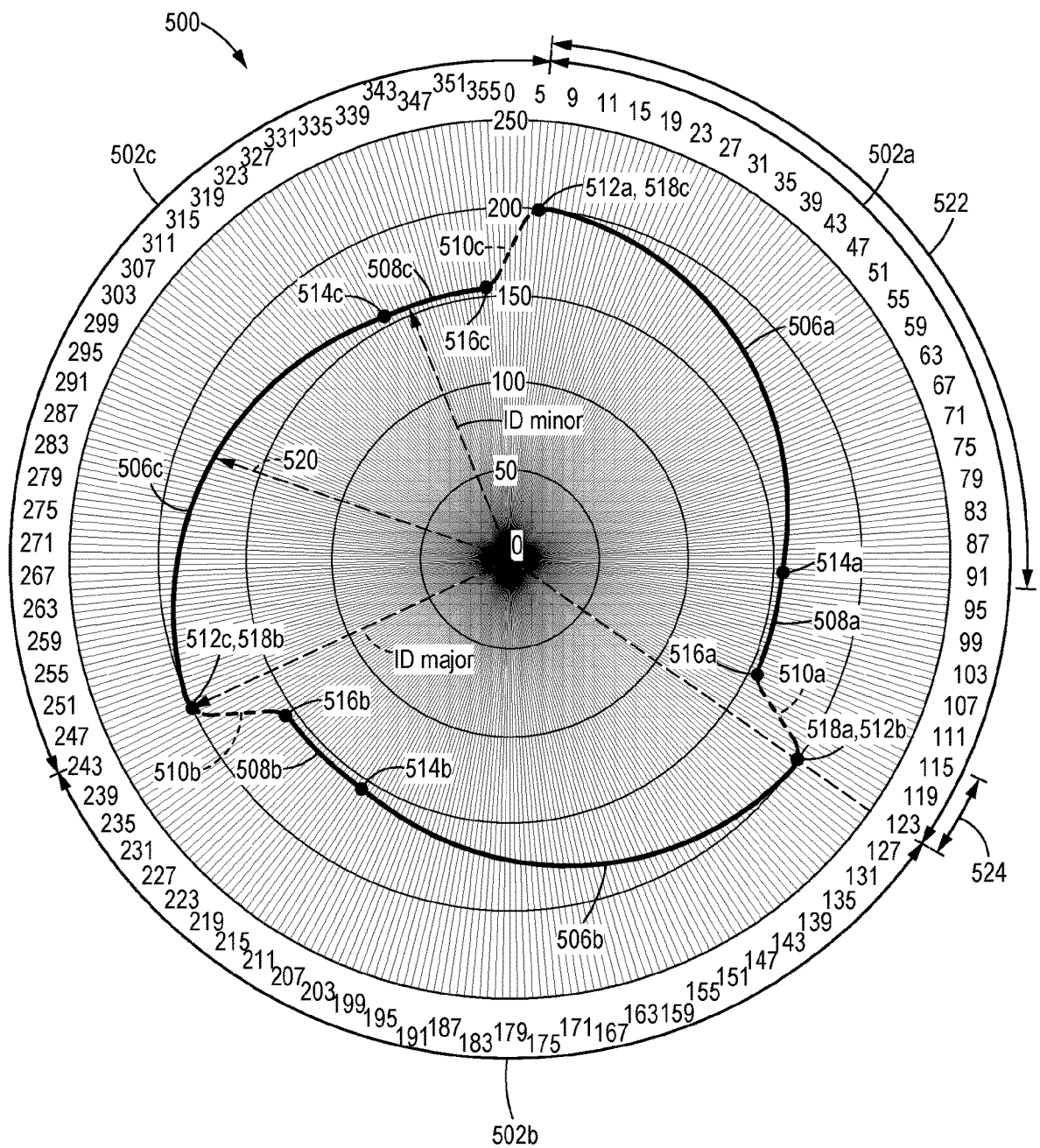
FIG. 5 depicts the relative dimensions of the bearing element inner surface, constructed in accordance with an embodiment of the present disclosure.

FIG. 5 depicts the relative dimensions of the bearing element inner surface, in accordance with an embodiment of the present disclosure. In particular, FIG. 5 depicts the relative dimensions of the smooth profile of the inner surface 54 of the bearing element 50. Here, relative dimensions of the inner surface 54 are exaggerated in order to clearly show the changes in the radial dimensions 520 of the inner surface 54. While the dimensions appear to vary forty-five (45) units of radial measurement (e.g., from approximately 155 to 200 units) on the plot 500, it should be understood that the actual change in dimensions may be a fraction of the change depicted on the plot 500. In some embodiments, the ratio of the shaft 18 length to the bearing element 50 diameter is selected to be in the range of 0.3 to 0.8. In a nominal turbocharger application, the variance of the inner surface 54 diameter measurements may be on the order of 10-30 microns between maximum (major) and minimum (minor) measurements. Throughout the disclosure, the bearing elements 50 are designed for the shaft 18 to rotate in a clock-wise direction, relative to the view of the inner surface 54 depicted in FIG. 5.

In the plot 500, a plurality of sections 502a, 502b, 502c are depicted. In the plot 500, the axial direction 11 extends into and out of the page, perpendicularly, and the radial direction 15 extends outward from the center through each of the 360 degrees. Further, the rotation of the shaft 18 is in the clockwise direction of the plot 500. Here, the section 502a extends through approximate dimensions of 5 degrees to 125 degrees, for a total of 120 degrees. The section 502 includes a taper portion 506a between a first arc-span point 512a and a second arc-span point 514a, a constant-radius portion 508a between the second arc-span point 514a and a third arc-span point 516a, and a transition portion 510a between the third arc-span point 516a and the fourth arc-span point 518a.

The taper portion 506a extends through a first angular distance 522, here between approximately 5 degrees through approximately 90 degrees, or 85 total degrees of angular distance. In the clockwise direction, a radial dimension 520 of the inner surface 54 goes through a smooth transition between an ID-major dimension at the first arc-span point 512a (relative radial dimension ~200 units) to the to a ID-minor dimension at the second arc-span point 514a (relative radial dimension ~155 units). The rate of change of the radial dimension 520 of the inner surface 54 may decrease at a constant rate through the taper portion 506a, having inflection points near the first arc-span point 512a and the second arc-span point 514a. The radial dimension of the inner surface 54 decreases at a non-constant rate through the taper portion 506a in some other embodiments. As disclosed herein, a smooth transition comprises a surface without a discontinuity in the surface (e.g., such as when a first arc intersects with a second arc).

As the shaft 18 rotates in the clockwise direction, the shaft encounters an increased converging circumferential profile area for generating hydrodynamic pressure. The generated hydrodynamic pressure permits the shaft to achieve higher speeds and helps reduce noise and vibrations produced by the rotating shaft 18.

Continuing to the next portion, the constant-radius portion 508a, extends between approximately 90 degrees to 115 degrees of angular distance. The constant-radius portion 508a maintains a constant radius of the ID-minor dimension of approximately 155 units. The constant radius portion 508a may be used to measure a minimum diameter measurement during bearing element inspections and may also serve as a resting support for the shaft 18.

Continuing to the next portion, the transition portion 510a extends between a second angular distance 524, here between 115 degrees to 125 degrees, or 10 degrees total of angular distance. Like the taper portion 506a, the radius dimension 520 of the inner surface 54 varies in the transition portion 510. Here, the radius dimension 520 transitions from the ID-minor dimension (155 units) at the third arc-span point 516a to the ID-major dimension (200 units) at the fourth arc-span point 518a. The transition may be a constant change of the radius dimension 520 for each degree of angular distance, or in some embodiments exhibit an "S-shaped" transition, with an inflection point in the middle of the transition portion 510a. The transition portion 510a restores the radial dimension 520 of the inner surface 54 to the ID-major dimension to for generation of a subsequent taper portion 506b as the shaft 18 continues to rotate about the axis 11.

In the transition portion 510, the radius dimension 520 does not extend beyond the ID major dimension, the maximum dimension radius dimension 520 of both the transition portion 510 and the taper portion 506.

In some embodiments, the openings 68, 69 associated with the lube oil system 23 are placed in a transition portion 510. For example, the transition portion 510 of each section 502 may include at least one opening 68 to provide oil to the inner surface 54 of the bearing element 50. In one example, the opening 68 is provided within the transition portion 510 near the point 512, 518. The oil is dragged by the rotating shaft 18 along the taper portion 506 towards the constant-radius portion 508. In other embodiments, lube oil may be added via small grooves extending axially that feeds oil to the beginning of the taper portion 506.

In some embodiments, the first angular distance 522 (e.g., comprising the taper portion 506a between the first arc-span point 512a and the second arc-span point 514a) is greater than the second angular distance 524 (e.g., comprising the transition portion 510a between the third arc-span point 516a and the fourth arc-span point 518a). In some embodiments, the first angular distance is twice as large as the second angular distance 524. In yet other embodiments, the first angular distance 522 is selected to be at least 5-15 times as large as the second angular distance 524. Thus, the smooth profile of the inner surface 54 is distinguished from a typical bearing element having a sinusoidal variance in the inner radius dimension. Varying of the ratio of the first angular distance 522 to the second angular distance 524 may be based on the selection of the lubricating fluid, shaft 18 properties, intended shaft rotational speed, and the like.

In some embodiments, the bearing element 50 may generate hydrodynamic pressures when the shaft 18 is rotating in reverse (e.g., counter-clockwise in FIG. 5). In such embodiments, generation of hydrodynamic pressures is limited by low-load and/or low-speed applications. Further, the ratios of angular distance of the taper portion 506, the constant-radius portion 508, and the transition portion 510 may be varied to generate hydrodynamic pressures when the shaft 18 is operating in reverse.

At each intersection between the different portions (506a, 508a, 510a) of the section 502a, the inner surface 54 comprises a smooth profile with a continuous surface. Further, the intersection between the different sections 502 in the plurality of sections 502a, 502b, 502c, is also a smooth transition. Here, the first arc-span point 512a of the first section 502a is at the same position of the fourth arc-span point 518c of the third section 502c. The transition between a first section (e.g., 502a) and an adjoining section 502 (e.g., 502b) also presents a smooth and continuous inner surface 54.

In embodiments with three sections, as depicted in FIG. 5, each section 502 comprises 120 degrees of angular distance, with adjoining sections repeated one after the other. The same features of the first section 502a are repeated to the subsequent sections 502b and 502c. In other embodiments, the number of the plurality of sections may be varied. For example, two sections of 180 degrees of angular distance each or four sections of 90 degrees of angular distance each may be used.

Figure 6:
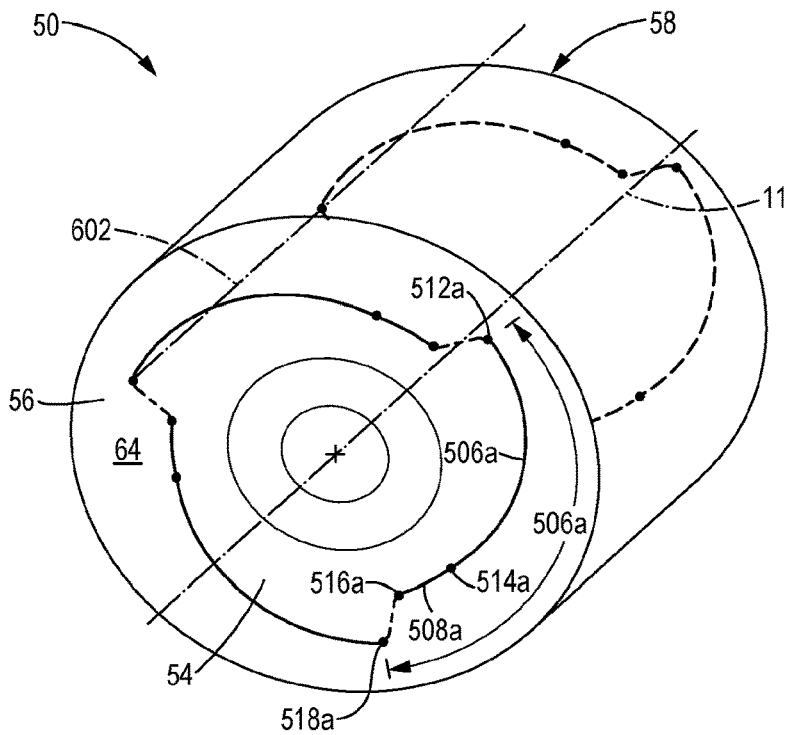
FIG. 6 depicts a perspective view of a first bearing element, constructed in accordance with an embodiment of the present disclosure.

FIG. 6 depicts a perspective view of a first bearing element, in accordance with an embodiment of the present disclosure. In particular, FIG. 6 depicts the bearing element 50. The bearing element 50 includes the same features as depicted in FIGS. 3-4, but also includes details of the smooth profile of the inner surface 54. The inner surface 54 includes three sections, with the first section 502a labeled with some aspects depicted in FIG. 5. FIG. 6 also depicts the axial dimension 11, and a ridge 602. Here, the ridge 602 is aligned with a first/fourth arc-span point 512/518, at a location of an ID-major dimension. The ridge 602 also parallels the axial dimension 11, resulting in a constant location of each of the arc-span points along the axial dimension 11. It is also noted that similar to FIG. 5, the changes in the radial dimension 520 of the inner surface 54 are exaggerated in FIG. 6

Figure 7:
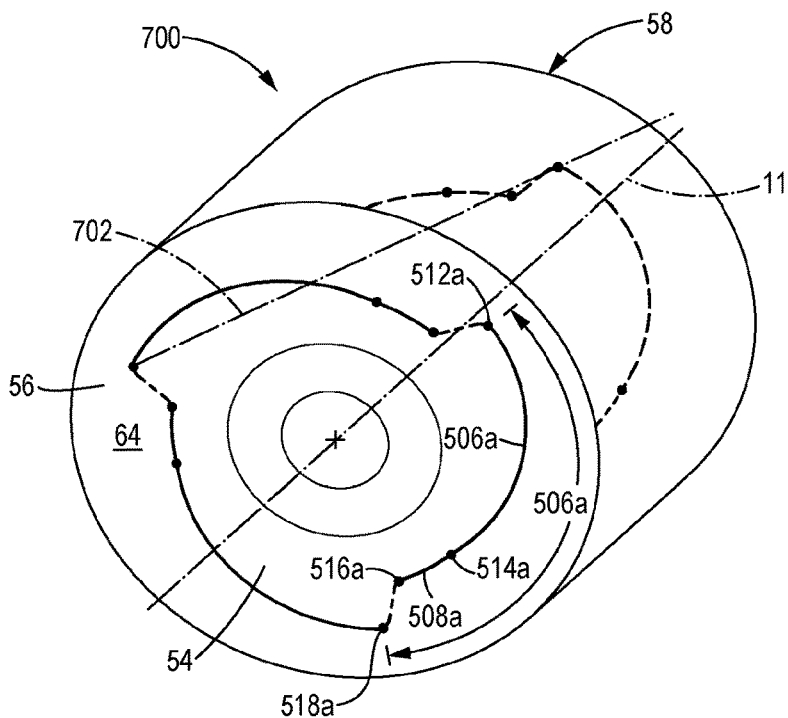
FIG. 7 depicts a perspective view of a second bearing element, constructed in accordance with an embodiment of the present disclosure.

FIG. 7 depicts a perspective view of a second bearing element, in accordance with an embodiment of the present disclosure. In particular, FIG. 7 depicts a bearing element 700, as a variant to the bearing element 50. Here, instead of the ridge 602, the bearing element 700 includes a skew axis 702 that is at an angle to the axial dimension 11. Like the ridge 602, the first/fourth arc span point 512/518 is aligned with the skew axis 702. Thus, the location of the ID-major dimension may change angular location at different points along the axial dimension 11. In some embodiments, the skew axis 702 changes at a constant rate along the axial dimension 11. In one embodiment, the skew axis may result in a 10 degree rotation of the first/fourth arc span point 512/518 from the first end 56 to the second end 58. In another embodiment, the skew axis may be curved, resulting in no angular offset between the first and second ends 56, 58, but a maximum angular offset at a mid-point along the axial dimension 11.

Figure 8:
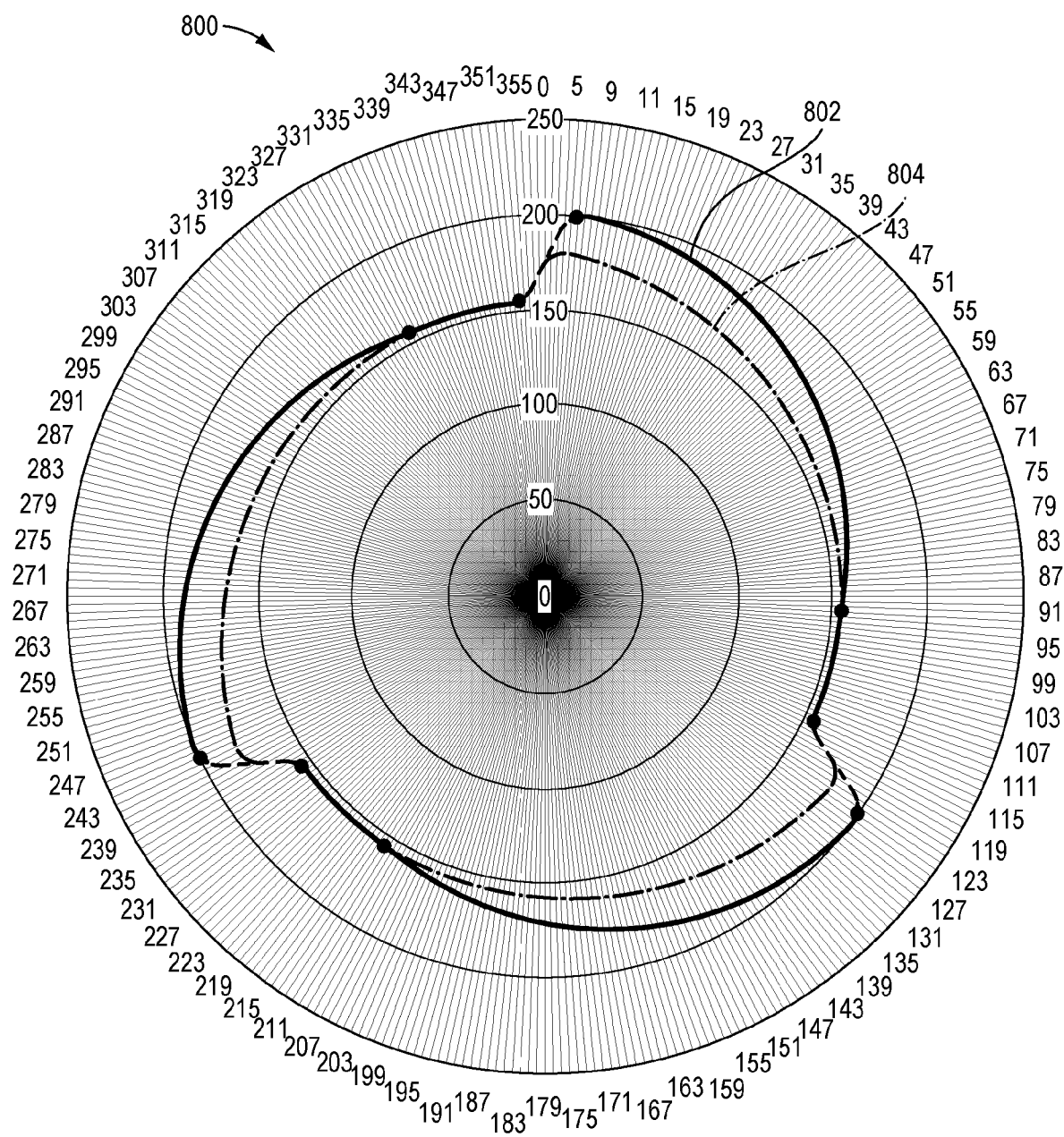
FIG. 8 depicts relative dimensions of an inner surface at multiple locations along an axial dimension, in accordance with an embodiment of the present disclosure.

FIG. 8 depicts relative dimensions of an inner surface at multiple locations along an axial dimension, in accordance with an embodiment of the present disclosure. In particular, FIG. 8 depicts the plot 800 having a first inner-surface trace 802 and a second inner-surface trace 804. The first inner-surface trace 802 is similar to the inner surface depicted in the plot 500 of FIG. 5. For example, the first trace 802 includes three sections, each section 502 comprising a taper portion 506, a constant-radius portion 508, and a transition portion 510, with the radial dimension 520 varying between an ID-major and an ID minor dimension, as disclosed more fully throughout.

However, the second inner-surface trace 804 is distinguished from the first inner-surface trace 802 in that while it maintains the same ID-minor dimension as the first inner-surface trace 802, the ID-major dimension of the second inner-surface trace 804 approaches the (common between the two traces) ID-minor dimension. Here, the ID-major dimension of the second trace 804 is at approximately 175 units. Thus, the difference in relative dimensional changes between ID-major and ID-minor dimensions of the second trace 804 is half as large (e.g., a 0.5 ratio) as the maximum difference in relative dimensional changes between ID-major and ID-minor dimensions of the first trace 802 (e.g., a 1.0 ratio). In yet other embodiments, the difference between the magnitude of change of the ID-major dimension may vary as a ratio between 0.0 and 1.0, with 0.0 indicating a constant radius throughout the angular distance of the section and 1.0 indicating a maximum difference between the ID-major and ID-minor dimensions throughout the angular distance of the section.

In some embodiments, the value of the ID-major dimension varies (as discussed along with FIG. 7) along the axial dimension 11. For example, a bearing element may be constructed such that at each end 56, 58 of the bearing element 50 the ratio between ID-major and ID-minor is 0.0. At a middle portion (e.g., a mid-point) of the bearing element 50, the ratio between ID-major and ID-minor is 1.0. Thus, the bearing element 50 will have the smallest clearance around the shaft 18 at each of the ends of the bearing element 50, with a maximum difference between the ID-major and ID-minor dimension occurring at the mid-point along the axial direction 11. In yet another embodiment, the ratio between ID-major and ID-minor is 0.0 at the first end 56 of the bearing element 50 and the ratio between ID-major and ID-minor is 1.0 at the second 58 of the bearing element 50, with the ratio increasing (e.g., at a constant rate) from 0.0 to 1.0 along the axial direction 11.

One advantage of varying the ratio between ID-major and ID-minor along the axis 11 is to permit direction of flow of the lubrication fluid. For example, a bearing element 50 having a smaller ID-major dimension at both ends than at a midpoint along the axis 11 may be used to direct the lubrication fluid towards the midpoint of the bearing element 50.

INDUSTRIAL APPLICABILITY

The bearing elements 50 disclosed herein may be used in various rotating machines. For example, they may be used in turbocharger bearings to reduce sub-synchronous vibrations and noises. However, the teaching of this disclosure may be employed with equal efficacy in many other mechanical applications, including other automotive related technologies. Machines with the bearing elements 50 installed may achieve higher rotational speeds. The smooth profile of the inner surface 54 produces a unidirectional convergence of a fluid film and provides increased converging circumferential profile area for generating hydrodynamic pressure.

The bearing elements 50 may be machined from solid materials, for example, steel, aluminum, copper, and the like. In the taper portion 506, a shaft 18 rotating in a clockwise-direction, will be presented with an inner-surface having a maximum radial dimension 520 (at the first arc-span point 512*a*) to a minimum radial dimension 520 (at the second arc-span point 514*a*). Thus, it is presented with a converging circumferential profile area for generating hydrodynamic pressure. One advantage realized is reduced noise and vibrations, thus permitting higher shaft rotational speeds.

The bearing elements 50 may be realized as either a semi-floating bearing or a full-floating bearing. Embodiments with a semi-floating bearing include two oil films. An inner film between the bearing element 50 inner surface 54 and the shaft 18, and an outer film between the bearing element outer diameter and the housing.

In some embodiments, a turbocharger may comprise multiple bearing elements 50. In an embodiment with a first (compressor-side) bearing element and a second (turbine-side) bearing element, each of the bearing elements 50 may be constructed with the same inner surface 54 profile. However, in other embodiments, it is possible to vary the construction of the bearing element 50 between the first and second bearing elements. For example, each of the bearing elements may include a skew axis, no skew axis, varying ID-major dimensions, or constant ID-major dimensions along the axial dimension 11.

Moreover, while some features are described in conjunction with certain specific embodiments, these features are not limited to use with only the embodiment with which they are described. Rather, aspects of the specific embodiments can be combined with or substituted by other features disclosed on conjunction with alternate embodiments.

What is claimed is:

1. A bearing element for use in a turbocharger comprising:
an inner surface having a smooth profile and comprising a plurality of sections, each section having a taper portion between a first arc-span point and a second arc-span point, a constant-radius portion between the second arc-span point and a third arc-span point, and a transition portion between the third arc-span point and a fourth arc-span point; and
an inner-surface radius dimension that changes from an inner-diameter major dimension at the first arc-span point to an inner-diameter minor dimension at the second arc-span point and changes from the inner-diameter minor dimension at the third arc-span point to the inner-diameter major dimension at the fourth arc-span point;
wherein:
the inner surface having the smooth profile comprises a continuous surface at the first, second, third, and fourth arc-span points; and
the fourth arc-span point of a first section adjoins the first arc-span point of a subsequent section, and the inner-surface radius dimension decreases at a constant rate per degree of angular direction through at least half of the taper portion.

2. The bearing element of claim 1, further comprising a first angular distance between the first arc-span point and the second arc-span point and a second angular distance between the third arc-span point and the fourth arc-span point, wherein the first angular distance is larger than the second angular distance.

3. The bearing element of claim 2, wherein the first angular distance is at least twice as large as the second angular distance.

4. The bearing element of claim 1, wherein the inner surface is configured to receive a cylindrical shaft.

5. The bearing element of claim 1, wherein the bearing element comprises a semi-floating bearing.

6. A bearing element for use in a turbocharger comprising:
an inner surface configured to receive a cylindrical shaft, the inner surface having a smooth profile and comprising a plurality of sections, each section having a taper portion between a first arc-span point and a second arc-span point, a constant-radius portion between the second arc-span point and a third arc-span point, and a transition portion between the third arc-span point and a fourth arc-span point;
an inner-surface radius dimension that changes from an inner-diameter major dimension at the first arc-span point to an inner-diameter minor dimension at the second arc-span point and changes from the inner-diameter minor dimension at the third arc-span point to the inner-diameter major dimension at the fourth arc-span point;
a first angular distance between the first arc-span point and the second arc-span point; and
a second angular distance between the third arc-span point and the fourth arc-span point, the second angular distance being larger than the first angular distance; wherein:
the inner surface having the smooth profile comprises a continuous surface at the first, second, third, and fourth arc-span points; and
the fourth arc-span point of a first section adjoins a first arc-span point of a subsequent section; and the inner-surface radius dimension decreases at a constant rate per degree of angular direction through at least half of the taper portion.

7. The bearing element of claim 6, wherein the bearing element is machined from a rigid material.

8. The bearing element of claim 6, wherein the plurality of sections consists of three sections.

9. The bearing element of claim 6, the bearing element further comprising a skew axis at an angle to a longitudinal axis, wherein the first arc-span point is aligned along the skew axis.

10. The bearing element of claim 6, wherein the hearing element is a semi-floating bearing element.

11. The bearing element of claim 6, wherein the bearing element is a full-floating bearing element.

12. The bearing element of claim 6, the bearing element further comprising a longitudinal axis extending from a first end of the bearing element to a second end of the bearing element, wherein the inner-diameter major dimension varies along the longitudinal axis.

13. The bearing element of claim 12, wherein:
at both the first and second ends of the bearing element, the inner-diameter major dimension approaches the inner-diameter minor dimension; and
at a midpoint along the longitudinal axis between the first and second ends, a difference between the inner-diameter major dimension and the inner-diameter minor dimension is at a maximum.

14. The bearing element of claim 12, wherein:
at the first end of the bearing element, the inner-diameter major dimension approaches the inner-diameter minor dimension; and
at the second end of the bearing element, a difference between the inner-diameter major dimension and the inner-diameter minor dimension is at a maximum.

15. The bearing element of claim 6, further comprising an opening located within the transition portion, the opening configured to provide lube oil flow to the inner surface.

16. The bearing element of claim 6, wherein the first angular distance is nine times as large as the second angular distance.

17. A turbocharger bearing system comprising:
a first bearing element having:
an inner surface configured to receive a cylindrical shaft, the inner surface having a smooth profile and comprising a plurality of sections, each section having a taper portion between a first arc-span point and a second arc-span point, a constant-radius portion between the second arc-span point and a third axe-span point, and a transition portion between the third arc-span point and a fourth arc-span point;
an inner-surface radius dimension that changes from an inner-diameter major dimension at the first arc-span point to an inner-diameter minor dimension at the second arc-span point and changes from the inner-diameter minor dimension at the third arc-span point to the inner-diameter major dimension at the fourth arc-span point;
a first angular distance between the first arc-span point and the second arc-span point; and
a second angular distance between the third arc-span point and the fourth arc-span point, the first angular distance being larger than the second angular distance; wherein:
the inner surface having the smooth profile comprises a continuous surface at the first, second, third, and fourth arc-span points; and
the fourth arc-span point of a first section adjoins the first arc-span point of a subsequent section; and
a second bearing element configured to receive the cylindrical shaft; at least one of the first and second bearing elements comprises a bearing element having a varying ID-major dimension along a longitudinal axis; and the other of the first and second bearing elements comprises a bearing element having a constant ID-major dimension along the longitudinal axis.

18. The turbocharger bearing system of claim 17 comprising an integrated bearing element system, wherein the first bearing element is a first bearing element portion, the second bearing element is a second bearing element portion, and the first and second bearing element portions are integrated with a spacer portion.

* * * * *